July 11, 1967 J. BECKMANN 3,330,926

MINIATURE THERMOSTAT WITH BIMETAL DISK MOUNTED BETWEEN FRUSTO-CONICAL MEANS FORMED ON TOP AND BOTTOM HOUSING WALLS

Filed Nov. 17, 1965

2 Sheets-Sheet 1

INVENTOR
Joseph Beckmann
by Michael S. Striker
Attorney

MINIATURE THERMOSTAT WITH BIMETAL DISK MOUNTED BETWEEN FRUSTO-CONICAL MEANS FORMED ON TOP AND BOTTOM HOUSING WALLS

Filed Nov. 17, 1965

INVENTOR
Joseph Beckmann
by Michael S. Striker
Attorney

United States Patent Office 3,330,926

Patented July 11, 1967

3,330,926

MINIATURE THERMOSTAT WITH BIMETAL DISK MOUNTED BETWEEN FRUSTO-CONICAL MEANS FORMED ON TOP AND BOTTOM HOUSING WALLS

Joseph Beckmann, Pforzheim, Germany, assignor to Anstalt Tropa, Vaduz, Liechtenstein Filed Nov. 17, 1965, Ser. No. 508,288
Claims priority, application Germany, July 13, 1965, A 49,727
12 Claims. (Cl. 200—138)

ABSTRACT OF THE DISCLOSURE

A miniature thermostat in which a bimetal disk is mounted between the top and the bottom wall of a shallow preferably rhombus-shaped housing by a pair of substantially frusto-conical means aligned along a common axis with each other and respectively having their bases of larger diameter at the top and the bottom wall of the housing and engaging with the ends thereof opposite the aforementioned bases opposite surfaces of the disk at substantially central portions thereof, whereby an improved heat conduction to the disk is assured while the housing is protected against deformation.

The present invention relates to a miniature thermostat having a curved bimetal disc which is centrally held in a housing and which is provided with contacts cooperating with counter contacts in the housing. Such thermostats are adapted to be built into electrical machines or electrical appliances and serve to protect the same from overloads or from overheating.

For a fast and proper action of such thermostats it is necessary that the bimetal disc is nonshiftably mounted in the housing and that the whole thermostat is constructed so as to be proper heat conductive and protected against deformation as well as against penetration by matter impeding the proper function thereof, and in addition thereto the thermostat has to be properly electrically insulated. These conditions can be easily accomplished in thermostats having relatively large dimensions.

The present invention, however, relates to miniature thermostat, that is to a thermostat which has the smallest possible dimensions to be used in connection with small electrical machines and devices as used presently in great numbers in plants and especially in the home, where these devices are quite often subjected to overloads. In such small electrical devices there is however very little room available for the mounting of a thermostat and therefore it is necessary to construct the thermostat as small as possible. In such miniature thermostats it is, however, rather difficult to satisfy the above mentioned conditions necessary for a perfect functioning of the thermostat.

It is an object of the present invention to provide for a thermostat of minimum size and which is constructed to function perfectly under extended use.

It is an additional object of the present invention to provide for a miniature thermostat which is constructed of relatively few and simple components which can be easily made and assembled so that the thermostat may be manufactured at very reasonable cost.

With these objects in view, the miniature thermostat according to the present invention mainly comprises a housing having a bottom wall and a top wall, a bimetal disc in the housing between the top and bottom wall thereof, mounting means for mounting the bimetal disc spaced from the top and bottom wall of the housing and comprising a pair of substantially frusto-conical means aligned along a common axis with each other and respectively having their bases of larger diameter at the top and the bottom wall of the housing and engaging with the ends thereof opposite the aforementioned bases opposite surfaces of the disc at substantially central portions of the latter, a pair of contacts fixed to portion of the disc arranged spaced from and respectively to opposite sides of the central portions thereof, and a pair of counter contacts fixed to one of the aforementioned walls of the housing and respectively aligned with the pair of contacts. The bimetal disc is curved at a given temperature in one direction so that the contacts fixed thereto engage the counter contacts and the disc will snap over and be curved in a direction opposite to the first mentioned direction to separate the contacts from the counter contacts upon change of the given temperature. The thermostat preferably includes also conductor means insulated from the housing and connected to the counter contacts by means of which the miniature thermostat may be connected in circuit with an electrical apparatus or device.

The mounting of the bimetal disc in the housing between the two frusto-conical means is extremely simple and space saving. Therefore, the thermostat can be constructed with extremely small dimensions and be simply assembled. By properly dimensioning the height of the two frusto-conical means in relation to the overall height of the housing, the thickness of the bimetal disc and the height of the contacts and counter contacts, it is possible to provide for a certain pretension of the bimetal disc at a given temperature, whereby the temperature at which the bimetal disc will snap over to separate the contacts thereon from the counter contacts can be properly predetermined. The small height of the housing resulting from the aforementioned mounting of the bimetal disc therein will result in a great rigidity of the housing and protect the same against deformation. In addition, this small height will result in a quick heat transmission from the outside to the bimetal disc and therefore to a prompt action of the latter during change of the ambient temperature surrounding the housing. The small overall size of the whole thermostat permits also to mount the same in small spaces of small electrical apparatus and devices so the miniature thermostat may be conveniently mounted between the windings of the electrical device.

Preferably the housing of the miniature thermostat according to the present invention is substantially rhombus-shaped which facilitates insertion of the thermostat between the windings of an electrical device in such a manner that the thermostat is subsequently properly held between the windings. Preferably, the bimetal disc in the rhombus-shaped housing has an outline corresponding substantially to the cross section of the housing so that the bimetal disc will be secured against twisting relative to the housing and so that the contacts fixed to the bimetal disc will remain aligned with the counter contacts fixed to the housing. In addition, the rhombus shape of the bimetal disc permits to mount the contact thereon at a relatively great distance spaced from each other resulting during snapover of the bimetal disc in a relatively great movement of the contacts relative to the counter contacts, which in turn will result in a relatively great circuit braking capacity of the miniature thermostat. The housing is preferably gas-tightly sealed to provide an explosion proof thermostat which will function properly during extended use.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
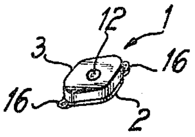
FIG. 1 is a perspective view of one embodiment of the thermostat according to the present invention drawn substantially to full scale.
Figure 2:
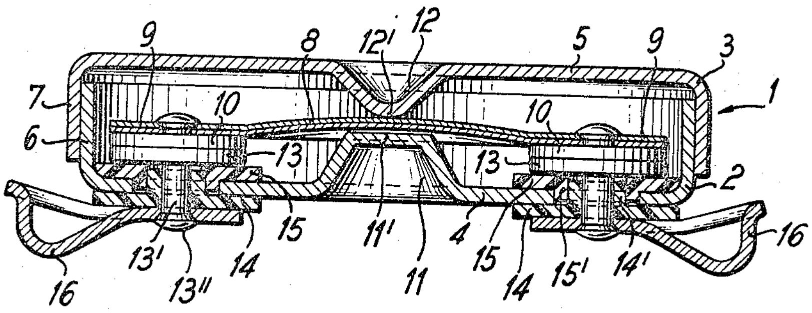
FIG. 2 is a longitudinal cross section through the embodiment shown in FIG. 1 and drawn to an enlarged scale.
Figure 3:
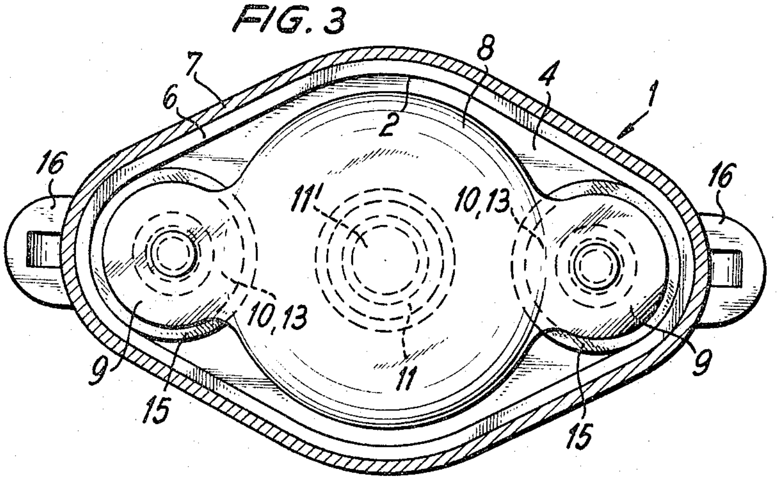
FIG. 3 is a horizontal cross section through the embodiment shown in FIG. 2.

Referring now to the drawings, and more specifically to FIGS. 1–3 of the same, it will be seen that the thermostats of the present invention illustrated in these three figures includes a substantially rhombus-shaped housing 1 which has an approximate length of 12 mm. and a width of approximately 8 mm.

The housing 1 is formed from two dish-shaped members 2 and 3. The member 2 has a bottom wall 4 and a peripheral wall 6, whereas the member 3 has a top wall 5 and a peripheral wall 7 in height substantially equal to the height of the peripheral wall of the member 2 and snugly surrounding and substantially fluid-tightly engaging the peripheral wall 6 substantially over the whole height thereof. In addition the walls 6 and 7 may be perfectly gas-tightly connected to each other by cementing, welding or by any other means for providing a perfect gas-tight seal.

A curved bimetal disc 8 is located in the housing 1 between the top wall 5 and the bottom wall 4 thereof. The bimetal disc 8 has an outline substantially corresponding to the rhombus-shaped cross section of the housing 1 and carries at opposite ends 9 thereof respectively a pair of disc-shaped contacts 10 fixed by welding or riveting thereto. The bimetal disc 8 is mounted in the housing 1 spaced from the top wall 5 and the bottom wall 4 thereof by a pair of substantially frusto-conical means 11 and 12 aligned along a common axis with each other and respectively having their bases of larger diameter at the bottom wall 4 and the top wall 5 of the housing and engaging with the ends thereof opposite the bases opposite surfaces of the disc 8 at substantially central portions of the latter. In the embodiment shown in FIGS. 1–3, the frusto-conical means 11 is formed by an integral, hollow, central substantially frusto-conical portion of the bottom wall 4, and the frusto-conical means 12 is formed by a hollow, integral, central substantially frusto-conical portion of the top wall 5. The frusto-conical portion 12 has at its inner end a rounded surface portion 12' engaging the top surface of the bimetal disc 8 at a substantially central portion thereof, whereas the conical hollow portion 11 has at its inner end a substantially plane circular surface portion 11' engaging the concave bottom surface of the bimetal disc 8 along a circle, when the disc is curved, as shown in FIG. 2, in such a manner that the contacts 10 thereon are in engagement with disc-shaped counter contacts 13 mounted at the bottom wall 4 of the housing insulated therefrom. The axial distance between the plane surface portion 11' and the rounded surface portion 12' is chosen in such a manner that an additional pretension is imparted to the bimetal disc 8 in the position shown in FIG. 2. By changing axial distance between the surface portions 11' and 12', the pretension of the bimetal disc 8 in the position as shown in FIG. 2 may be varied. The counter contacts 13 are insulated from the bottom wall 4 of the housing by a pair of insulating discs 14 and 15 arranged at opposite sides of the bottom wall 4 and respectively integrally formed with sleeve portions 14' and 15'. The outer sleeve portions 15' extend tightly through bores in the bottom wall 4 and the sleeve portions 14' extend tightly through the sleeve portions 15'. Rivet shafts 13' of the counter contacts 13 extend tightly through the sleeve portions 14' beyond the discs 14 and a pair of cable shoes 16 abutting against the bottom faces of the outer insulating discs 14 are fixed by means of the rivet heads 13' to the outer ends of the rivet shafts 13'.

The embodiment illustrated in the FIGURES 1–3 has the advantage that the mounting means for the bimetal disc 8 are constituted by hollow, frusto-conical portions integrally formed respectively with the top and the bottom wall of the housing portions, that the distance between the circular surface portions 11' and the rounded surface portion 12' may be chosen in such a manner to provide an additional pretension of the bimetal disc, and that the interengaging peripheral walls 6 and 7 of the housing portions 2 and 3 will result not only in a great rigidity of the housing 1, but also, especially when the peripheral walls are welded or otherwise fluid-tightly connected to each other, in a perfect seal. The thermostat as illustrated in FIGS. 1–3 may be constructed due to the aforementioned arrangement at a minimum height of about 4 to 6 mm.

Figures 4, 5:
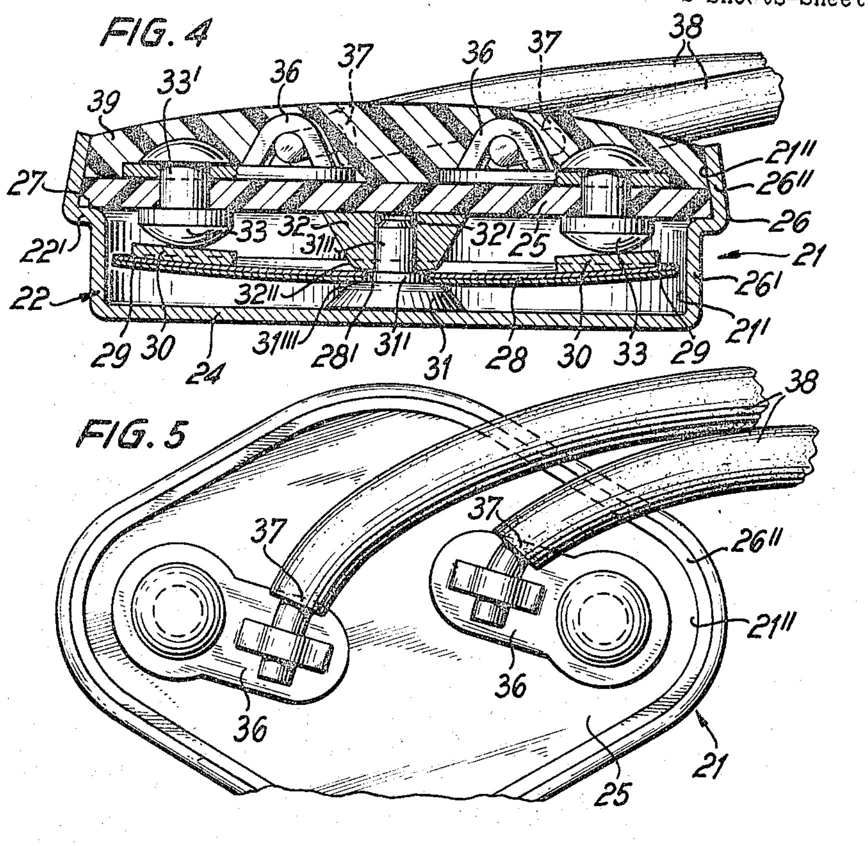
FIG. 4 is a longitudinal cross section of a second embodiment according to the present invention also drawn to an enlarged scale.
FIG. 5 is a partial top view of the embodiment shown in FIG. 4.
Figure 6:
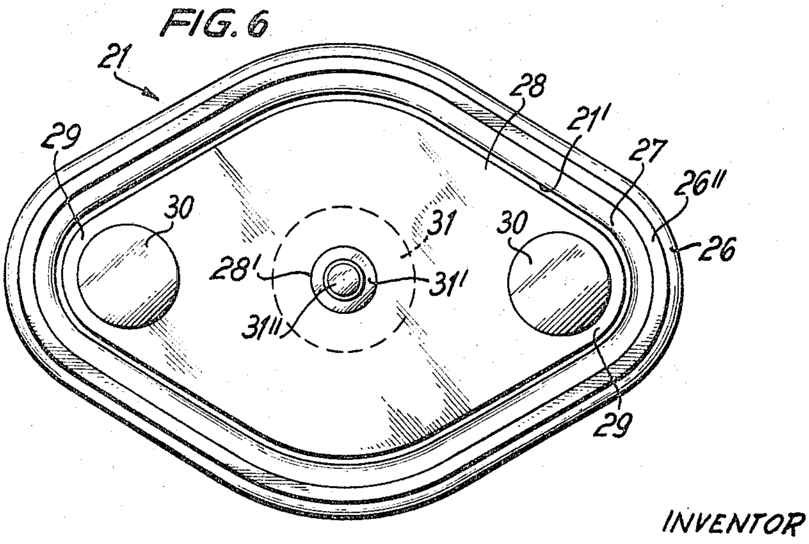
FIG. 6 is a top view of the embodiment shown in FIG. 4 with part of the top removed to show the interior of the thermostat.

FIGS. 4–6 illustrate a second embodiment of a miniature thermostat according to the present invention. The housing 21 of the embodiment illustrated in FIGS. 4–6 has also a substantially rhombus-shaped cross section, but a height slightly greater than that of the first described embodiment and the height of the housing 21 of the second embodiment is about 6 to 8 mm. The housing 21 of the second embodiment comprises a substantially trough-shaped member 22 having a flat bottom wall 24 and a peripheral wall 26 which is offset at 22' substantially midway between its height to form an outwardly extending annular shoulder 27 and dividing the peripheral wall 26 in a lower half 26' and an upper hald 26''. A plate 25 of the insulating material, for instance of plastic, ceramic material, or the like abuts with a peripheral portion of its bottom face against the annular shoulder 27 and is held thereagainst by an upper inwardly inclined portion of the upper half 26'' of the peripheral wall which snugly engages the peripheral edge surface of the plate 25. A bimetal disc 28 is located in the housing between the bottom wall 24 and the plate 25 and the bimetal disc 28 has an outline similar to the inner surface of the lower portion 26' of the peripheral wall 26 of the housing to be spaced therefrom by a small clearance as best shown in FIG. 6. The mounting means for mounting the bimetal disc 28 spaced from the bottom wall 24 and the plate 25 include in the embodiment illustrated in FIGS. 4–6 a pair of separate members 31 and 32 of substantially frustoconical configuration and each formed by a body of revolution. The frustoconical member 31 engages with a flat bottom face thereof the upper surface of the bottom wall 24 of the housing and this member is provided at the upper end thereof with a shoulder portion 31' and a pin portion 31'' projecting centrally of the shoulder portion 31' into a central bore formed in the member 32. The member 32 has an end face abutting against the bottom face of the plate 25 and the end of the member 32 opposite the end face thereof abuts against the upper face of the shoulder 31'. The bimetal disc 28 is formed with a central bore therethrough of a diameter substantially equal to the diameter of the shoulder 31' and the latter extends through the bore 28' of the disc substantially without play. The height of the shoulder 31' is substantially equal to the thickness of the bimetal disc 28. In order to permit the bimetal disc 28 to snap over from the position shown in FIG. 4 to an oppositely curved position, the surface portions 31''' and 32'' of the two members 31 and 32 at the facing ends of the two members curve respectively away from opposite disc surfaces as clearly shown in FIG. 4. The bimetal disc 28 assumes in its two extreme positions the configuration of the cutout of a spherical wall whereby the disc is reinforced up to the end portions 29 thereof which carry the contacts 30 fixed thereto for instance by welding. A pair of counter contacts 33 are respectively arranged opposite the contacts 30 on the bimetal disc 28 and the counter contacts 33 abut with upper surfaces thereof against the bottom face of the plate 25, whereas rivet shafts 33′ integral with the counter contact 33 extend through bores of the plate 25 beyond the upper surface of the plate and a pair of cable shoes 36 are respectively connected by riveting to the outer ends of the rivet shafts 33. The ends 37 of a pair of conductors 38 are connected in any convenient manner, for instance by soldering, to lugs projecting upwardly from the cable shoes 36. The cable shoes 36 and at least the ends 37 of the conductors 38 are located in a trough-shaped space 21″ formed by the top surface of the plate 25 and the upper portion 26″ of the peripheral wall 26 extending beyond the upper surface of the plate 25. The trough-shaped space 21″ is filled by a body 39 formed by a heat resistant, heat hardenable cast resin having a small coefficient of thermal expansion which is cast in the aforementioned trough-shaped space 21″ and which completely surrounds the cable shoes 36 and the ends 37 of the conductors 38 connected thereto to thus completely insulate the same. At the same time the body 39 of cast resin provides a perfect gas-tight seal of the lower housing part 21′ in which the bimetal disc 28 and the contacts 31 and counter contact 33 are located.

The embodiment illustrated in FIGS. 4–6 has the following advantages:

The two bodies of revolution 31 and 32 which respectively engage with end faces thereof the bottom surface of the plate 25 and the top surface of the bottom wall 24 of the housing and with the opposite ends thereof opposite surfaces of the disc 28, and the shoulder portion 31′ on the frusto-conical member 31 which fits substantially without clearance in a corresponding central bore of the bimetal disc 28 provide a central mounting of the disc 28, which, while substantially without play, will in no way prevent snap over of the disc between the end positions thereof. By machining each of the members 31 and 32 separately, it is possible to make the height of the two members as well as the height of the shoulder portion 31′ on the member 31 to very exact dimensions so that the position of the bimetal disc 28 relative to the counter contacts 33 in the assembled thermostat may be exactly determined, especially since the position of the plate 25 which carries the counter contact 33 in the assembled thermostat is also exactly fixed by the shoulder portion 27 of the housing. Thereby, the pretension imparted to the bimetal disc 28 in the position shown in FIG. 4 in which the contacts 30 engages the counter contacts 33 can be exactly determined and the temperature at which the bimetal disc 28 will snap over from the position shown in FIG. 4 to separate the contacts from each other can be narrowed down to a few degrees. Since the members 31 and 32 abut with the bases thereof respectively against the bottom wall 24 of the housing and the plate 25 and since the member 32 abuts with the end opposite the base thereof against the shoulder 31′ on the member 31 the housing is rigidly reinforced at the central portion thereof against extraneous pressure forces acting thereon, whereby any change in the position of the contact members of the thermostat through such forces is positively prevented and an exact functioning of the thermostat will be assured. Furthermore, the members 31 and 33 which engage with relatively large plane end faces thereof the plate 25 and the bottom wall 24 of the housing will assure a good heat transmisison to the center of the bimetal disc 28, while the small clearance between the outer periphery of the bimetal disc and the peripheral wall of the housing will also assure a good heat transmission to the outer portions of the bimetal disc so that the time of response of the thermostat will be very short.

The offsetting of the peripheral wall 26 of the housing 21 will result not only in an additional reinforcing of the housing, but provide also a proper shoulder for support of the plate 25. The plate 25 of plastic or ceramic can be manufactured at low cost by punching or pressing and the manufacture of this plate from insulating material saves also the otherwise necessary relatively expensive insulation of the counter contacts 33. The trough-shaped space defined by the upper surface of the plate 25 and the portion of the peripheral wall 26 extending beyond this upper surface permits also to cast in the trough-shaped space a heat hardenable casting resin which not only perfectly insulates the members located in the space, but which will also perfectly seal the space of the housing 21 beneath the plate 25 in which the contact elements of the thermostat are located.

The above described construction of the embodiment illustrated in FIGS. 4–6 will also greatly facilitate the assembly of the various elements of the thermostat since the housing member 22, the element 31, the bimetal disc 28 and the upper member 32 can simply be placed one upon the other without a fixed mechanical connection and be properly centered with respect to each other. The trough-shaped space 21″ formed at the top of the thermostat after the plate 25 is placed against the shoulder 27 of the housing member 22 will also facilitate casting of a heat hardenable resin onto the top of the thermostat, whereby the housing is gas-tightly sealed in a perfect manner and the ends of the conductors as well as the cable shoes and the outer ends of the contacts 33 are at the same time perfectly insulated. This simple assembly of the various components of the thermostat permits the manufacture of thermostats of high quality with relatively unskilled labor.

It will be understood that each of the elements described above, or two or more together, may also find a useful application in other types of miniature thermostats differing from the types described above.

While the invention has been illustrated and described as embodied in a miniature thermostat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. A miniature thermostat comprising, in combination, a housing having a bottom wall and a top wall; a bimetal disc in said housing between said top and bottom wall thereof; mounting means for mounting said bimetal disc spaced from said top and said bottom wall of said housing and comprising a pair of substantially frusto-conical means aligned along a common axis with each other and respectively having their bases of larger diameter at said top and said bottom wall and engaging with the ends thereof opposite said bases opposite surfaces of said disc at substantially central portions of the latter; a pair of contacts fixed to portions of said discs arranged spaced from and respectively to opposite sides of said central portions thereof; a pair of counter contacts fixed to one of said walls and respectively aligned with a pair of contacts, said disc being curved at a given temperature in one direction so that the contacts fixed thereto engage said counter contacts and said disc snapping over and being curved in a direction opposite to said one direction to separate said contacts from said counter contacts upon change of said given temperature; and conductor means insulated from said housing and connected to said counter contacts.

2. A miniature thermostat as set forth in claim 1, wherein said housing has a substantially rhombus-shaped cross section and wherein said bimetal disc has an outline substantially corresponding to said cross section of said housing.

3. A miniature thermostat as set forth in claim 1, wherein said housing in gas-tightly sealed.

4. A miniature thermostat as set forth in claim 3, wherein said housing is formed by a pair of dish-shaped members having each a peripheral wall of a height substantially equal to the height of the other dish-shaped member, the peripheral wall of one of said dish-shaped member being located within and engaging with the outer surface thereof the inner surface of the other of said pair of dish-shaped members substantially over the whole height thereof and being gas-tightly joined thereto.

5. A miniature thermostat as set forth in claim 1, wherein said pair of frusto-conical means are respectively formed by integral, hollow, central substantially frusto-conical portions of said top and said bottom wall extending toward each other.

6. A miniature thermostat as set forth in claim 5, wherein one of said hollow frusto-concial portions has at its inner end a rounded surface portion and the other a substantially plane circular surface portion engaging a concave surface of said disc along a circle when the disc is curved in said one direction, and the axial distance between said rounded portion and said plane surface portion being chosen so as to additionally pretension said disc when the latter is curved in said one direction.

7. A miniature thermostat as set forth in claim 1, wherein said pair of frusto-conical means comprises a pair of separate members each formed by a body of revolution, said members abutting with their bases of larger diameter respectively against said bottom and said top wall and with faces opposite said bases against a substantially central portion of said bimetal disk, the combined height of said pair of members and the thickness of said disk is equal to the distance between the opposite surfaces of said top and bottom wall so as to reinforce said housing.

8. A miniature thermostat as set forth in claim 7, wherein said bodies of revolution have respectively plane end faces respectively abutting against the inner surfaces of said top and said bottom wall of said housing, one of said bodies of revolution being formed with an axial bore therethrough and the other including a pin portion extending snugly into said axial bore and having an annular shoulder portion against which the end of said one body opposite the end face thereof abuts.

9. A miniature thermostat as set forth in claim 8, wherein said bimetal disc is formed with a central bore therethrough having a diameter substantially equal to that of said annular shoulder portion, said shoulder portion having a height substantially equal to the thickness of said disc and extending snugly through said central bore of the latter, the surface portions of said two bodies of revolutions adjacent opposite surfaces of said disc being rounded so as to curve respectively away from said opposite disc surfaces.

10. A miniature thermostat as set forth in claim 2, wherein said housing comprises a substantially trough-shaped member having a peripheral wall which is offset substantially midway of its height to form an outwardly extending annular shoulder, and said top wall of said housing being formed by a plate abutting with a peripheral portion of its bottom face against said annular shoulder and being held thereagainst by an upper inwardly inclined portion of said peripheral wall, said plate closing the lower half of said housing and said upper portion of said peripheral wall extending beyond the top face of said plate and defining with said top face in the upper half of said housing a trough shaped space.

11. A miniature thermostat as set forth in claim 10, wherein said plate is made from insulating material and formed with a pair of spaced bores therethrough, said counter contacts abutting against said bottom face of said plate and respectively extending with portions thereof through said bores in said plate, and including a pair of conductors respectively connected by lugs to portions of said counter contacts projecting beyond the top face of said plate.

12. A miniature thermostat as set forth in claim 11, and including a heat resistant, heat hardenable casting resin having a small coefficient of thermal expansion filling said trough-shaped space in said upper half of said housing.

References Cited

UNITED STATES PATENTS

| | | | |
|---|---|---|---|
| 2,685,014 | 7/1954 | Mang | 200—138 |
| 2,707,738 | 5/1955 | Weissheimer et al. | 200—138 |
| 3,213,240 | 10/1965 | Harper et al. | 200—138 X |

BERNARD A. GILHEANY, *Primary Examiner.*

H. A. LEWITTER, *Assistant Examiner.*